United States Patent
Takayanagi (10) Patent No.: US 9,567,926 B2
(45) Date of Patent: Feb. 14, 2017

(54) CONTROL UNIT OF INTERNAL COMBUSTION ENGINE

(71) Applicant: MITSUBISHI HEAVY INDUSTRIES, LTD., Tokyo (JP)

(72) Inventor: Ko Takayanagi, Tokyo (JP)

(73) Assignee: MITSUBISHSI HEAVY INDUSTRIES, LTD., Tokyo (JP)

( * ) Notice: Subject to any disclaimer, the term of this patent is extended or adjusted under 35 U.S.C. 154(b) by 309 days.

(21) Appl. No.: 14/353,790

(22) PCT Filed: Sep. 27, 2012

(86) PCT No.: PCT/JP2012/074873
§ 371 (c)(1),
(2) Date: Apr. 24, 2014

(87) PCT Pub. No.: WO2013/111385
PCT Pub. Date: Aug. 1, 2013

(65) Prior Publication Data
US 2014/0298805 A1    Oct. 9, 2014

(30) Foreign Application Priority Data

Jan. 24, 2012 (JP) .................................. 2012-011670

(51) Int. Cl.
*F02B 33/44* (2006.01)
*F02D 41/00* (2006.01)
(Continued)

(52) U.S. Cl.
CPC ............. *F02D 41/005* (2013.01); *F02D 21/08* (2013.01); *F02D 23/00* (2013.01);
(Continued)

(58) Field of Classification Search
CPC   F02D 41/005; F02D 41/1458; F02D 41/0052; F02D 41/0007; F02D 23/00; F02D 21/08
(Continued)

(56) References Cited

U.S. PATENT DOCUMENTS

2003/0140629 A1    7/2003   Shirakawa
2009/0050119 A1*   2/2009   Inoue .................... F02D 41/045
                                                        123/564
(Continued)

FOREIGN PATENT DOCUMENTS

JP    8-144867 A       6/1996
JP    08144867 A   *   6/1996
(Continued)

OTHER PUBLICATIONS

Korean Notice of Allowance, dated Aug. 19, 2015, for Korean Application No. 10-2014-7010988, together with an English translation thereof.

(Continued)

*Primary Examiner* — Nicholas J Weiss
*Assistant Examiner* — Jason T Newton
(74) *Attorney, Agent, or Firm* — Birch, Stewart, Kolasch & Birch, LLP (57) ABSTRACT

The present invention relates to a control unit of an internal combustion engine capable of performing a coordinate control of an exhaust gas recirculation (hereinafter abbreviated as "EGR") gas supply amount by an EGR apparatus and a supercharging amount by a supercharger provided with a variable flow mechanism. The control unit comprises: a state quantity estimation section for calculating an in-cylinder oxygen excess ratio based on an operating state of the internal combustion engine; and a switching part for switching the respective opening degree commands for the EGR valve and the variable flow mechanism of the supercharger (Continued)

so that the opening degree of the EGR valve and the opening degree of the variable flow mechanism become smaller than in a normal state when the internal combustion engine is determined to be in the transient state based on the calculated in-cylinder oxygen excess ratio.

8 Claims, 6 Drawing Sheets

(51) Int. Cl.
    *F02D 21/08* (2006.01)
    *F02D 23/00* (2006.01)
    *F02D 41/04* (2006.01)
    *F02D 41/14* (2006.01)
    *F02B 37/02* (2006.01)
    *F02B 37/18* (2006.01)
(52) U.S. Cl.
    CPC ..... *F02D 41/0007* (2013.01); *F02D 41/0052* (2013.01); *F02D 41/045* (2013.01); *F02D 41/1458* (2013.01); *F02B 37/025* (2013.01); *F02B 37/18* (2013.01); *F02D 2041/0017* (2013.01); *F02M 26/00* (2016.02); *Y02T 10/144* (2013.01); *Y02T 10/47* (2013.01)
(58) Field of Classification Search
    USPC ........................................................ 60/605.2
    See application file for complete search history.

(56) References Cited

U.S. PATENT DOCUMENTS

| | | | | |
|---|---|---|---|---|
| 2009/0055076 | A1* | 2/2009 | Onishi | ................ F02D 41/1458 701/103 |
| 2010/0318279 | A1 | 12/2010 | Meyer et al. | |

FOREIGN PATENT DOCUMENTS

| | | | | |
|---|---|---|---|---|
| JP | 10-212979 | A | | 8/1998 |
| JP | 10212979 | A | * | 8/1998 |
| JP | 10-231730 | A | | 9/1998 |
| JP | 10231730 | A | * | 9/1998 |
| JP | 2000-110574 | A | | 4/2000 |
| JP | 2001-59452 | A | | 3/2001 |
| JP | 2001059452 | A | * | 3/2001 |
| JP | 2002-161791 | A | | 6/2002 |
| JP | 2003-106181 | A | | 4/2003 |
| JP | 2005-30319 | A | | 2/2005 |
| JP | 2005-155331 | A | | 6/2005 |
| JP | 3733281 | B2 | | 10/2005 |
| JP | 2006-16975 | A | | 1/2006 |
| JP | 2006016975 | A | * | 1/2006 |
| JP | 2010-26472 | A | | 2/2010 |
| JP | 2011-163200 | A | | 8/2011 |
| KR | 10-2003-0036173 | A | | 5/2003 |
| WO | WO 2007/110774 | A2 | | 10/2007 |

OTHER PUBLICATIONS

International Preliminary Report on Patentability mailed Aug. 7, 2014 for PCT/JP2012/074873 with English Translation.
International Search Report dated Dec. 25, 2012 for PCT/JP2012/074873.
Decision to Grant a Patent effective Apr. 5, 2016 issued in the corresponding Japanese Application No. 2012-011670 with an English Translation.
Extended European Search Report effective Apr. 5, 2016 issued in the corresponding EP Application No. 12866915.7.
Notice of Allowance effective Jun. 8, 2016 issued in corresponding Chinese Application No. 201280053266.1 with an English translation.

* cited by examiner

CONTROL UNIT OF INTERNAL COMBUSTION ENGINE

TECHNICAL FIELD

The present invention relates to a control unit of an internal combustion engine, particularly to a coordinate control of an exhaust gas recirculation (hereinafter abbreviated as "EGR") control by an EGR apparatus of an internal combustion engine and a supercharger control by a supercharger provided with a variable flow mechanism.

BACKGROUND ART

An internal combustion engine which comprises a supercharger control device capable of controlling the supercharging amount or the supercharging pressure of a super charger provided with a variable flow mechanism, and an exhaust gas recirculation (EGR) apparatus which recirculates a part of the exhaust gas into an intake passage or a cylinder, is known. In such an internal combustion engine, particularly in a diesel engine, by controlling the supercharger provided with a variable flow mechanism, the discharge pressure is increased and then the recirculation amount of the exhaust gas by EGR is increased, whereby the intake flow and the supply air oxygen concentration will not be ensured, and thus smoke (PM) will be increasingly generated; or the discharge pressure is decreased, whereby the recirculation amount of the EGR gas will not be ensured, and thus an effect of reducing NOx will not be obtained, for example. That is, there is a relationship between the control of EGR and the control of the supercharger provided with a variable flow mechanism where they have influence on each other.

In this regard, a technique of controlling the EGR control and the supercharger control in a coordinated manner is known. An example of coordinate control of this type is described in Patent Document 1. In Patent Document 1, it is disclosed that in a operating region where exhaust gas recirculation (EGR) is carried out, by feeding back the EGR control valve so as to bring the air-fuel ratio to the target air-fuel ratio while adjusting the opening degree of the variable flow mechanism to be within a predetermined range, it is possible to reduce NOx and PM.

CITATION LIST

Patent Literature

[PTL 1]
JP 2000-110574 A

SUMMARY

Technical Problem

However, in Patent Document 1, as the exhaust gas recirculation is carried out in a partial load region, it is not possible to reduce NOx and PM by a coordinate control in other load regions. Further, PM emission amount depends largely on the in-cylinder oxygen excess ratio; however, the in-cylinder oxygen excess ratio is not taken into consideration as a control parameter in the coordinate control described in Patent Document 1, which leaves room for improvement.

Figure 8:
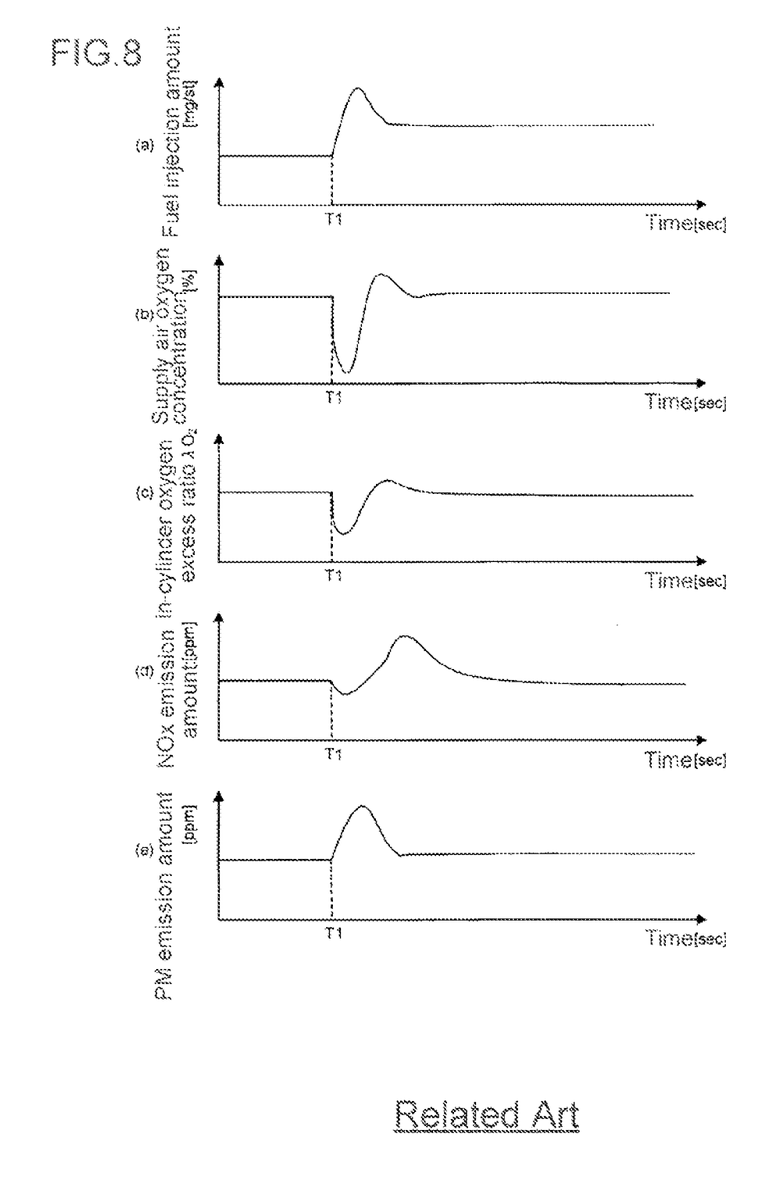
FIG. 8 is a chart showing transition of a fuel injection amount, supply air oxygen concentration, intake air oxygen excess ratio, NOx emission amount, and PM emission amount, in the transient state according to a conventional art.

Thus, such coordinate control of the EGR control and the supercharger control is not sufficient. Particularly, with regard to a transient state where the fuel injection amount in each cylinder is varied with time due to change of load of the internal combustion engine, there are problems described hereinafter. FIG. 8 includes charts showing transition of the fuel injection amount, supply air oxygen concentration, in-cylinder oxygen excess ratio, NOx emission amount, and PM emission amount, in the transient state. As shown in (a) of FIG. 8, with increase in the load of the internal combustion engine at the time T1, the fuel injection amount is increased and gets under a feedback control so as to accord with a new target fuel injection amount. When the fuel injection amount is increased as above, the intake amount is also increased; and therefore the supply air oxygen concentration and the in-cylinder oxygen excess ratio are temporarily decreased and then increased, and then get under a feedback control so as to accord with a new supply air oxygen concentration. As shown in (b) of FIG. 8, in the transient state, as the supply air oxygen concentration is temporarily increased, NOx contained in the exhaust gas is increased, which leads to a problem. Further, as shown in (c) of FIG. 8, in the transient state, as the in-cylinder oxygen excess ratio is temporarily decreased, PM contained in the exhaust gas is increased, which leads to a problem.

The present invention has been made in view of the above problems and is to provide a control unit of an internal combustion engine capable of performing coordinate control of the EGR control and the supercharger control so that NOx and PM in the exhaust gas in the transient state where the load of the internal combustion engine is varied, can be suppressed.

Solution to Problem

To solve the above problems, the present invention provides a control unit of an internal combustion engine comprising:

an exhaust gas recirculation (EGR) control part for sending an EGR command signal so as to bring an EGR gas supply amount by an EGR apparatus to a target EGR gas supply amount to control an opening degree of an EGR valve;

a supercharger control part for sending a supercharging command signal so as to bring a supercharging amount of a supercharger provided with a variable flow mechanism to a target supercharging amount to control an opening degree of the variable flow mechanism;

an in-cylinder oxygen excess ratio calculation part for calculating an in-cylinder oxygen excess ratio based on an operating state of the internal combustion engine;

a transient state determination part for determining whether the internal combustion engine is in a transient state based on the oxygen excess ratio in the cylinder calculated by the in-cylinder oxygen excess ratio calculation part; and a switching part for switching the EGR command signal and the supercharging command signal so that the opening degree of the EGR valve and the opening degree of the variable flow mechanism become smaller than in a normal state when the internal combustion engine is determined to be in the transient state by the transient state determination part.

According to the present invention, when the transient state of the internal combustion engine is detected based on the in-cylinder oxygen excess ratio, the EGR command signal and the supercharging command signal are switched by the switching part, whereby the opening degree of the EGR valve and the opening degree of the variable flow mechanism are controlled so that they become smaller than in the normal state. It is thereby possible to suppress temporary increase in the supply air oxygen concentration or temporary decrease in the in-cylinder oxygen excess ratio in the transient state, and therefore to perform a coordinate control which enables reduction of emission amounts of NOx and PM.

The switching part may be configured to switch the EGR command signal and the supercharging command signal so as to bring the opening degree of the EGR valve to a lower limit which is preliminarily set and the opening degree of the variable flow mechanism to a lower limit which is preliminarily set. According to such a configuration, by controlling the opening degree of the EGR valve and the opening degree of the variable flow mechanism so that they are brought to their lower limits, it is possible to suppress temporary increase in the supply air oxygen concentration or temporary decrease in the in-cylinder oxygen excess ratio in the transient state, and therefore to reduce the emission amounts of NOx and PM.

In this case, it is preferred that the lower limit of the opening degree of the EGR valve is preliminarily set depending upon the operating state of the internal combustion engine. The lower limit of the opening degree of the EGR valve is set to a finite value, which is not zero, depending upon the operating state, whereby it is possible to suppress the emission amounts of NOx and PM while a good operating efficiency of the internal combustion engine is maintained.

The transient state determination part may comprise:

a first determination part for determining whether the in-cylinder oxygen excess ratio calculated by the in-cylinder oxygen excess ratio calculation part is not greater than a first threshold value; and a second determination part for determining whether an in-cylinder oxygen excess ratio difference between the in-cylinder oxygen excess ratio calculated by the in-cylinder oxygen excess ratio calculation part and an optimum value of the in-cylinder oxygen excess ratio which is preliminarily set on the basis of the operating state of the internal combustion engine is not less than a second threshold value;

and may be configured to determine the internal combustion engine to be in the transient state when the first determination part determines that the in-cylinder oxygen excess ratio is not greater than the first threshold value and the second determination part determines that the in-cylinder oxygen excess ratio difference is not less than the second threshold value.

In view of the fact that the in-cylinder oxygen excess ratio temporarily decreases in the transient state, the first determination part determines whether the in-cylinder oxygen excess ratio calculated by the in-cylinder oxygen excess ratio calculation part is not greater than a first threshold value, thereby to determine whether the transient status is present. Meanwhile, in view of the fact that in the transient state, the in-cylinder oxygen excess ratio becomes away from the optimum value defined based on the operating state of the internal combustion engine, the second determination part determines whether the in-cylinder oxygen excess ratio difference between the in-cylinder oxygen excess ratio and the optimum value thereof is not less than the second threshold value, thereby to determine whether the transient status is present. Particularly, according to the above embodiment, an accurate determination can be done by determining that the transient state is present when both the above first determination part and the second determination part determine that the internal combustion engine is in the transient state.

In this case, the transient state determination part may comprise a third determination part for determining whether a supercharging pressure difference between a supercharging pressure of the supercharger and an optimum value of the supercharging pressure which is preliminarily set on the basis of the operating state of the internal combustion engine is not less than a third threshold value, and may be configured to determine the internal combustion engine to be in the transient state when the third determination part further determines that the supercharging pressure difference is not less than. In view of the fact that in the transient state, the supercharging pressure becomes away from the optimum value defined based on the operating state of the internal combustion engine, the third determination part further determines whether the supercharging pressure difference between the supercharging pressure and the optimum value thereof is not less than the third threshold value, thereby to determine whether the transient status is present. It is thereby possible to detect the transient status more accurately.

The switching part may be configured to cancel a switching control of the EGR command signal and the supercharging command signal when the internal combustion engine is determined not to be in the transient state by the transient state determination part. According to this configuration, when the transient state determination part determines that the transient state ends, the switching control by the switching part will be cancelled, and the normal operating status will be resumed.

In this case, the transient state determination part may comprise:

a fourth determination part for determining whether the in-cylinder oxygen excess ratio calculated by the in-cylinder oxygen excess ratio calculation part is greater than a fourth threshold value; and a fifth determination part for determining whether an in-cylinder oxygen excess ratio difference between the in-cylinder oxygen excess ratio calculated by the in-cylinder oxygen excess ratio calculation part and an optimum value of the in-cylinder oxygen excess ratio which is preliminarily set on the basis of the operating state of the internal combustion engine is less than a fifth threshold value;

and may be configured to determine the internal combustion engine not to be in the transient state when the fourth determination part determines that the in-cylinder oxygen excess ratio is greater than the fourth threshold value or the fifth determination part determines that the in-cylinder oxygen excess ratio difference is less than the fifth threshold value. According to this configuration, the normal state can be rapidly resumed when either the above fourth determination part or the fifth determination part determines that the internal combustion engine is not in the transient state. The fourth threshold value and the fifth threshold value may be set to be the same as the above first threshold value and the second threshold value, respectively, or to be different from the above first threshold value or the second threshold value.

The switching part may be configured to reset the EGR command signal upon canceling the switching control so as to bring the opening degree of the EGR valve to a prescribed opening degree which is larger than the opening degree at the time of the switching control. When the transient state ends and the normal operating state is resumed, a delay may be caused until the opening degree of the EGR valve which has been closed by the switching control in the transient state is increased, whereby the supply air oxygen concentration may be increased, and therefore NOx may be increased. In this embodiment, it is possible to control the opening degree of the EGR valve so as to bring the opening degree to the prescribed opening degree at the end of the transient state to rapidly increase the opening degree of the EGR valve, whereby it is possible to prevent the increase of NOx.

Further, the control unit of an internal combustion engine may further comprise a supercharging command signal limiting part for limiting the supercharging command signal so as to bring the opening degree of the variable flow mechanism to an opening degree in a steady state of the internal combustion engine. In general, in a case where the opening degree of a supercharger is under a feedback control, when the actual supercharging pressure is higher than the target supercharging pressure, a supercharging command signal to decrease the supercharging pressure is generated. When the supercharging signal is a decreasing command as above, if the transient state (e.g. sudden acceleration of a vehicle) occurs in which the load of the internal combustion engine is increased, the time lag until the supercharging pressure is turned upward will be increased. Then, the in-cylinder oxygen excess ratio will be decreased in the transient state, and the PM in the exhaust gas will be increased, which may lead to a problem. According to the above embodiment, by limiting the supercharging command signal so as to bring the opening degree of the variable flow mechanism to an opening degree in a steady state of the internal combustion engine, the opening degree of the variable flow mechanism is prospectively maintained at the opening degree in the normal state so that the supercharging pressure will not be excessively decreased, whereby it is possible to suppress the time lag at the time of occurrence of the transient state, thereby to suppress the increase of PM.

Advantageous Effects

According to the present invention, when the transient state of the internal combustion engine is detected on the basis of the in-cylinder oxygen excess ratio, the EGR command signal and the supercharging command signal are switched by the switching part, whereby the opening degree of the EGR valve and the opening degree of the variable flow mechanism are controlled so that they become smaller than in the normal state. It is thereby possible to suppress temporary increase in the supply air oxygen concentration or temporary decrease in the in-cylinder oxygen excess ratio in the transient state, and therefore to perform a coordinate control which enables reduction of emission amounts of NOx and PM.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

First Embodiment

Figure 1:
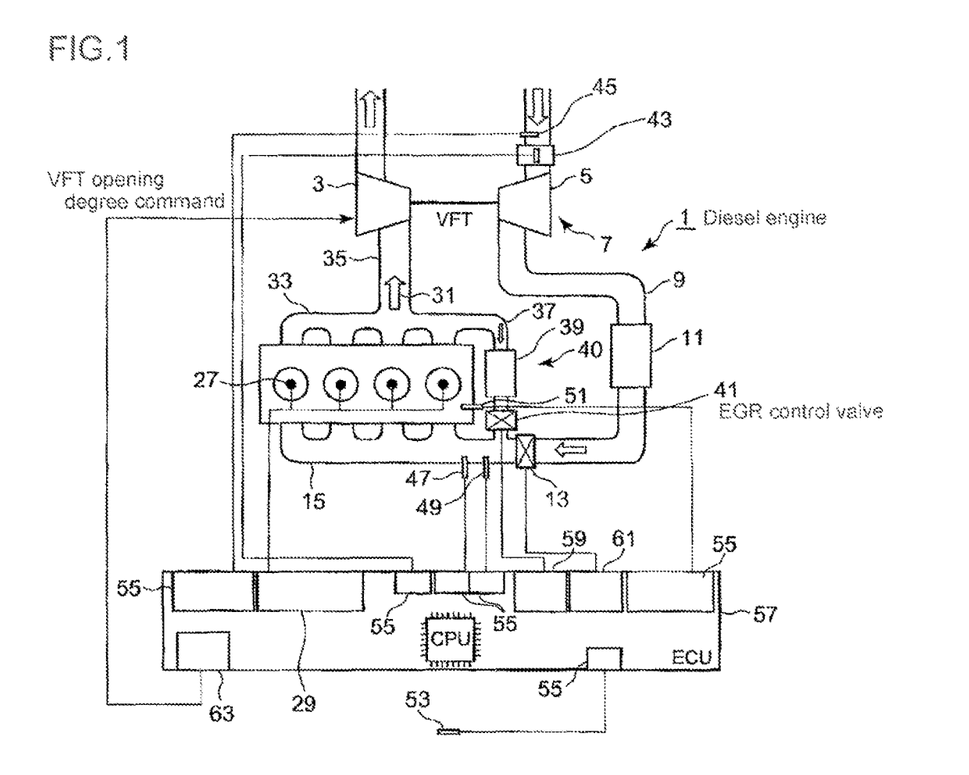
FIG. 1 is a schematic diagram illustrating an entire construction of a control unit of an internal combustion engine according to a first embodiment of the present invention.

FIG. 1 is a schematic diagram illustrating an entire construction of a control unit of an internal combustion engine according to a first embodiment of the present invention. The diesel engine (engine) 1 comprises an exhaust gas turbine 3 and an exhaust gas turbocharger 7 having a compressor 5 which is coaxially driven by the exhaust gas turbine 3. Air discharged from the compressor 5 of the exhaust gas turbocharger 7 is passed through an intake passage 9 into an intercooler 11, and the intake gas is cooled. Then, the intake flow rate is regulated by means of an intake throttle valve 13, and thereafter the intake gas is flown into a combustion chamber, which is not shown, of the engine 1 from an intake manifold 15.

Figure 3:
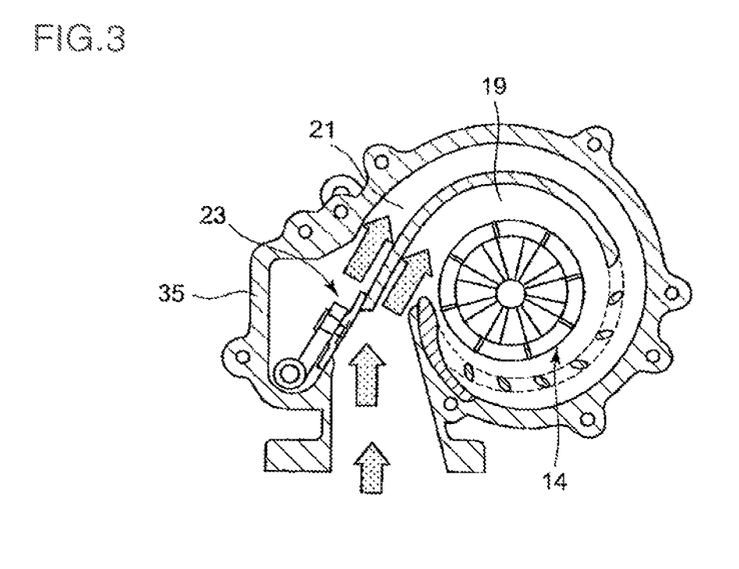
FIG. 3 is a cross-sectional view of a major part of a supercharger provided with a variable flow mechanism.

The exhaust gas turbocharger 7 is a turbocharger provided with a variable flow mechanism (VFT), a specific construction of which is shown in FIG. 3. As illustrated in FIG. 3, the exhaust turbocharger 7 comprises an inner scroll 19 which continuously extends circumferentially around a turbine rotor, and an outer scroll 21, and further comprises a VFT control valve 23 which is a switching part for switching a mode where the exhaust gas is flown into only the inner scroll 19 and a mode where the exhaust gas is flown into both the inner scroll 19 and the outer scroll 21. By actuating the VFT control valve 23, the mode where the exhaust gas is flown into only the inner scroll 19 and the mode where the exhaust gas is flown into both the inner scroll 19 and the outer scroll 21 can be switched.

Further, as illustrated in FIG. 1, the engine 1 is provided with a fuel injection device 29 which is configured to regulate the injection timing and the injection amount through a fuel injection valve 27 and to inject fuel into the combustion chamber. The combustion gas combusted in the combustion chamber of the engine 1, i.e. exhaust gas 31, is passed through exhaust ports provided for respective cylinders, an exhaust manifold 33 which aggregates the exhaust ports, and an exhaust passage 35, and then drives the exhaust gas turbine 3 of the exhaust gas turbocharger 7 to become a power source for the compressor 5, and is exhausted through the exhaust passage 35 and an exhaust gas aftertreatment device (not shown).

Further, an EGR passage 37 is branched from the exhaust passage 35 or the exhaust manifold 33, and on the downstream side of the intake throttle valve 13, an EGR apparatus 40 to which a part of the exhaust gas is input through an EGR cooler 39 and an EGR control valve 41, is provided.

On the upstream side of the exhaust gas turbocharger 7, an air flow meter 43 and an air temperature sensor 45 are provided. Within the intake manifold 15, an intake temperature sensor 47 and a supercharging pressure sensor 49 are provided. Further, an engine rotational speed sensor 51 and an air pressure sensor 53 are provided. Signals from the respective sensors are received by a control unit (ECU) 57 via a signal converter 55.

Further, a drive signal is output to the EGR control valve 41 via an EGR valve control part (EGR control part) 59, and an EGR valve opening degree signal is input into the control unit 57. Similarly, a drive signal is output to the intake throttle valve 13 via a throttle valve drive circuit 61, and a throttle valve opening degree signal is input into the control unit 57. Further, with regard to the exhaust gas turbocharger 7, a drive signal is output to the VFT control valve 23 (see FIG. 3) which constitutes the variable flow mechanism via a VFT valve control part (supercharger control unit) 63, and a valve opening degree signal of the VFT control valve 23 is input into the control unit 57.

Figure 2:
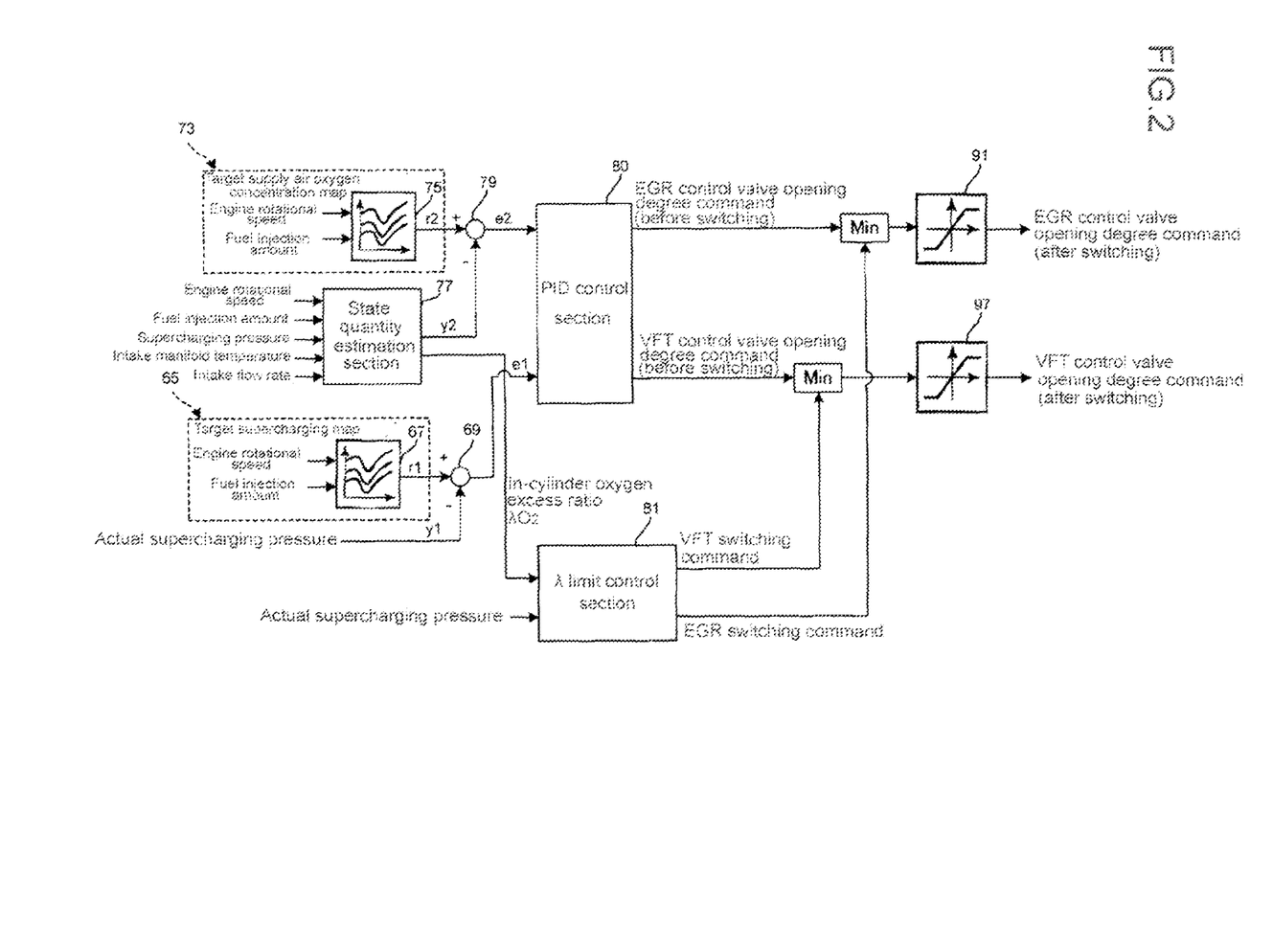
FIG. 2 is a block diagram illustrating an internal constitution of a control unit of an internal combustion engine according to the first embodiment of the present invention.

FIG. 2 is a block diagram illustrating an internal constitution of the control unit 57 of the internal combustion engine according to the first embodiment of the present invention. In the control unit 57, a coordinate control of the opening degree control of the EGR control valve 41 and the VFT control valve 23 is performed.

As illustrated in FIG. 2, by means of a target supercharging pressure setting part 65, a target supercharging pressure r1 is obtained by using a target supercharging pressure map 67 based on the engine rotational speed by the engine rotational speed sensor 51 and the fuel injection amount by the fuel injection device 29, which represent the operating status of the engine 1. An actual supercharging pressure y1 is obtained based on a signal from the supercharging pressure sensor 49. Then, a difference e1 between the actual supercharging pressure y1 and the target supercharging pressure r1 set by the target supercharging pressure setting part 65 is calculated by an adder-subtractor 69 and then is input into a PID control section 80 as a supercharging pressure control amount.

Similarly, with regard to the supply air oxygen concentration, by means of a target supply air oxygen concentration setting part 73, a target supply air oxygen concentration r2 is obtained by using a target supply air oxygen concentration map 75 based on the operation state of the engine 1 such as the engine rotational speed by the engine rotational speed sensor 51 and the fuel injection amount by the fuel injection device 29.

As the actual supply air oxygen concentration and the in-cylinder oxygen excess ratio, values calculated by a state quantity estimation section 77 are used. The state quantity estimation section 77 calculates the actual supply air oxygen concentration and the in-cylinder oxygen excess ratio based on the engine rotational speed by the engine rotational speed sensor 51, the fuel injection amount by the fuel injection device 29, the supercharging pressure by the supercharging pressure sensor 49, the intake manifold temperature by the intake temperature sensor 47, and the intake flow rate by the air flow meter 43, which represent the operating state of the engine 1. Then, a difference e2 between the actual supply air oxygen concentration y2 estimated by the state quantity estimation section 77 and the target supply air oxygen concentration r2 set by the target supply air oxygen concentration setting part 73 is calculated by an adder-subtractor 79 and then is input into the PID control section 80 as a supply air oxygen concentration control amount.

The PID control section 80 generates an opening degree command for the EGR control valve 41 (hereinafter also referred to as "EGR opening degree command") and an opening degree command for the VFT control valve 23 (hereinafter also referred to as "VFT opening degree command") based on the input supercharging pressure control amount e1 and the supply air oxygen concentration control amount e2 so as to bring the actual supercharging pressure y1 to the target supercharging pressure r1 as well as bring the actual supply air oxygen concentration y2 to the target supply air oxygen concentration r2. As described above, the PID control section 80 performs a coordinate control of the EGR control valve 41 and the control of the VFT control valve 23.

Meanwhile, the in-cylinder oxygen excess ratio estimated by the state quantity estimation section 77 and the actual supercharging pressure by the supercharging pressure sensor 49 are input into a $\lambda$ limit control section 81. The $\lambda$ limit control section 81 generates switching commands (an EGR switching command and a VFT switching command) for the EGR control valve opening degree command and the VFT control valve opening degree command, respectively, generated by the PID control section 80, based on the determination result of the transient state, which will be described below.

The EGR control command generated by the PID control section 80 is switched by the EGR switching command generated by the $\lambda$ limit control section 81, and then is output as an opening degree command signal for the EGR control valve 41 while the upper and the lower limits are limited by an EGR command value limiter 91. Similarly, the VFT control command generated by the PID control section 80 is switched by the VFT switching command generated by the $\lambda$ limit control section 81, and then is output as an opening degree command signal for the VFT control valve 23 while the upper and the lower limits are limited by an VFT command value limiter 97.

Figure 4:
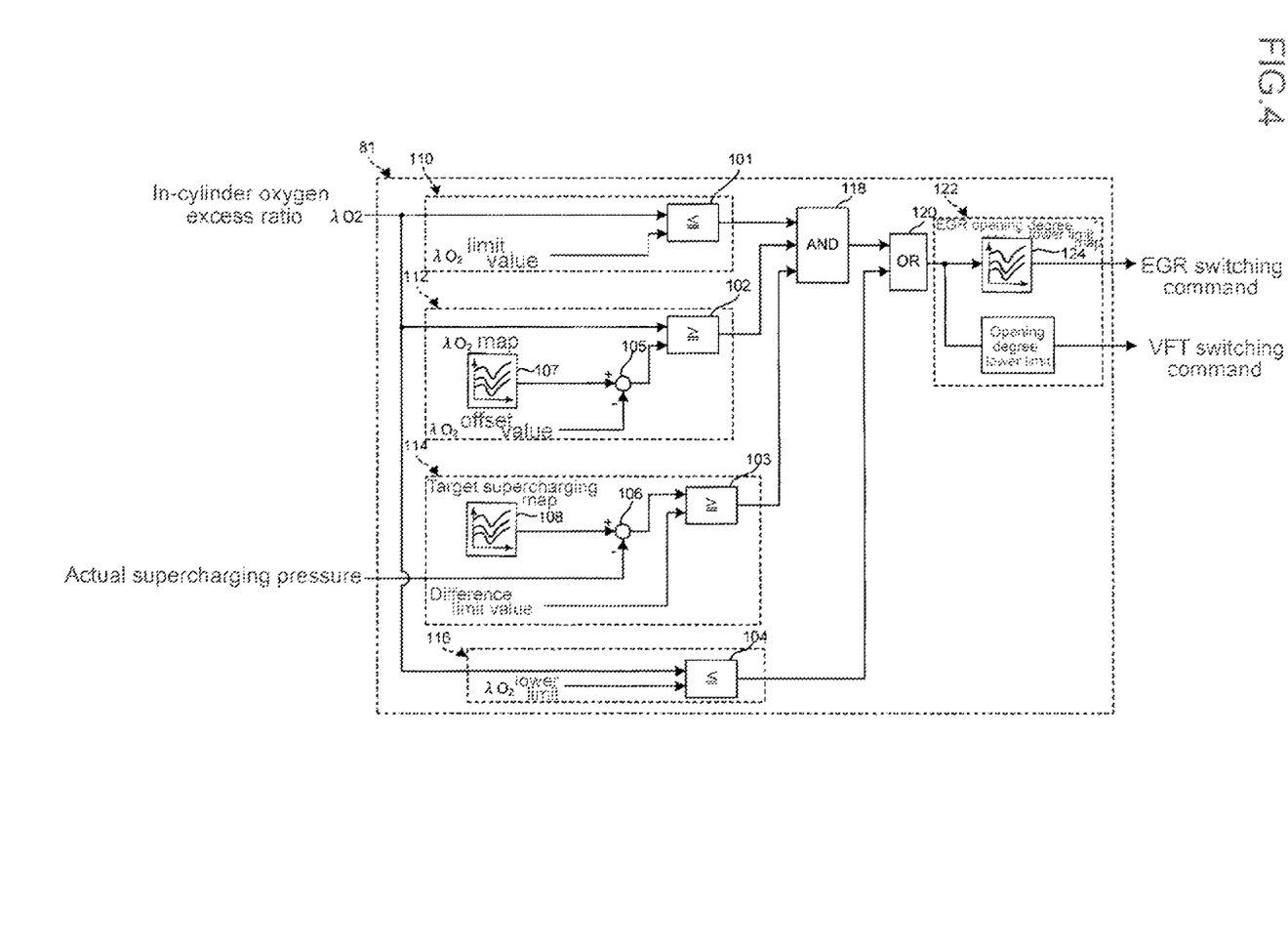
FIG. 4 is a block diagram illustrating an internal constitution related to a switching control of the λ limit control section.

FIG. 4 is a block diagram illustrating an internal constitution related to a switching control of the $\lambda$ limit control section 81 according to the present invention. As illustrated in FIG. 4, the in-cylinder oxygen excess ratio $\lambda O_2$ input into the $\lambda$ limit control section 81 is then input into comparators 101, 102 and 104 respectively, and the actual supercharging pressure is input into an adder-subtractor 106.

In a first determination section 110, whether the in-cylinder oxygen excess ratio $\lambda O_2$ is not greater than a predetermined. $\lambda O_2$ limit value (e.g. not greater than 2) is determined by the comparator 101. The $\lambda O_2$ limit value is an example of the "first threshold value" according to the present invention, and it is a threshold value for detecting a decrease in the in-cylinder oxygen excess ratio at the time of occurrence of the transient state. That is, by the first determination section 110, in view of the fact that the in-cylinder oxygen excess ratio temporarily decreases in the transient state, whether the input in-cylinder oxygen excess ratio is not greater than a first threshold value is determined, whereby whether the transient status is present is determined.

In the second determination section 112 having a $\lambda O_2$ map 107 defining the optimum value of the in-cylinder oxygen excess ratio for the operating state of the engine 1, the operating state of the engine 1 such as the engine rotational speed and the fuel injection amount is obtained, which is omitted in FIG. 4, and a corresponding optimum value of the in-cylinder oxygen excess ratio is output and then input into an adder-subtractor 105. Meanwhile, a $\lambda O_2$ offset value which is an example of the "second threshold value" according to the present invention is input into the adder-subtractor 105 to generate a difference from the optimum value of the in-cylinder oxygen excess ratio $\lambda O_2$, and whether the in-cylinder oxygen excess ratio $\lambda O_2$ less than the difference is determined by the comparator 102. That is, by the second determination section 112, in view of the fact that in the transient state, the in-cylinder oxygen excess ratio becomes away from the optimum value defined based on the operating state of the engine 1, whether the in-cylinder oxygen excess ratio difference between the in-cylinder oxygen excess ratio and the optimum value thereof is not less than the second threshold value is determined, whereby whether the transient status is present is determined.

In the third determination section 114 having a target supercharging pressure map 108 defining the optimum value of the supercharging pressure for the operating state of the engine 1, the operating state of the engine 1 such as the engine rotational speed and the fuel injection amount is obtained, which is omitted in FIG. 4, and a corresponding optimum value of the target supercharging pressure is output and then input into an adder-subtractor 106. Meanwhile, the actual supercharging pressure is input into the adder-subtractor 106 to generate a difference from the target supercharging pressure, and whether the difference is not less than the predetermined supercharging pressure difference limit value (which is an example of the "third threshold value" according to the present invention) is determined by the comparator 103. That is, by the third determination section 114, in view of the fact that in the transient state, the supercharging pressure becomes away from the optimum value defined based on the operating state of the engine 1, whether the supercharging pressure difference between the supercharging pressure and the optimum value thereof is not less than the third threshold value, is determined, whereby whether the transient status is present is determined.

The determination results by the first determination section 110, the second determination section 112 and the third determination section 114 are input into an AND circuit 118, and when all of the above determination sections determine that the engine 1 is in the transient state, a switching command is output via an OR circuit 120. By determining the transient state multiply based on different conditions by the first determination section 110, the second determination section 112 and the third determination section 114 as described above, it is possible to determine whether the transient status is present accurately.

By the fourth determination section 116, the in-cylinder oxygen excess ratio $\lambda O_2$ input into the $\lambda$ limit control section 81 and a predetermined $\lambda O_2$ lower limit are input into a comparator 104, and whether the in-cylinder oxygen excess ratio $\lambda O_2$ not greater than the $\lambda O_2$ lower limit. The $\lambda O_2$ lower limit is a threshold value which is set to be smaller than the $\lambda O_2$ limit value (the first threshold value) in the first determination section 110, and is a threshold value to determine that the transient state is present when a drastic reduction in the in-cylinder oxygen excess ratio $\lambda O_2$ is detected regardless of the determination results by the first determination section 110, the second determination section 112 and the third determination section 114. It is thereby possible to rapidly determine that the transient status is present when a drastic reduction in the in-cylinder oxygen excess ratio $\lambda O_2$ is detected.

When the engine 1 is determined to be in the transient state as described above, a switching command generation section 122 generates and outputs an EGR switching command and a VFT switching command. The EGR switching command is generated by using an EGR opening degree lower limit map 124 which defines the opening degree lower limit of the EGR control valve 41 based on the operating status of the engine 1. In this embodiment, the operating status of the engine 1 is obtained, and the EGR switching command for switching the EGR control command is generated so as to bring the opening degree of the EGR control valve to the opening degree lower limit based on the EGR opening degree lower limit map 124. On the other hand, the VFT switching command is generated so as to bring the opening degree of the VFT control valve 23 to the opening degree lower value (typically zero) regardless of the operating status of the engine 1.

When the engine 1 is determined to be in the transient state as described above, the EGR control command and the VFT control command are switched to control the opening degree of the EGR control valve 41 and the opening degree of the VFT control valve 23 so that they become smaller than in the normal state. The temporary increase in the supply air oxygen concentration and decrease in the in-cylinder oxygen excess ratio in the transient state can thereby be suppressed, and it is thereby possible to perform a coordinate control which enables reduction in the emission amount of NOx and PM.

Figure 5:
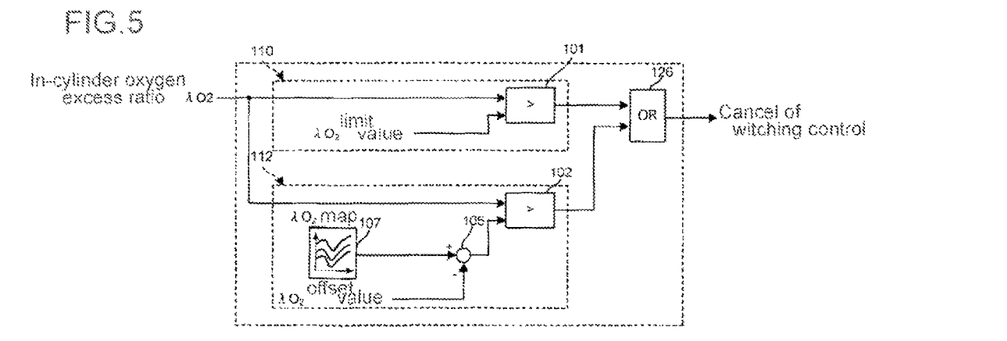
FIG. 5 is a block diagram illustrating an internal constitution related to a switching cancel control of the λ limit control section.

FIG. 5 is a block diagram illustrating an internal constitution related to a cancel control of the switching control in the $\lambda$ limit control section 81 according to the present invention. In the cancel control of the switching control, whether the engine 1 is not in the transient state is determined by the first determination section 110 and the second determination section 112. That is, in the first determination section 110, whether the in-cylinder oxygen excess ratio $\lambda O_2$ is greater than the predetermined $\lambda O_2$ limit value (e.g. not greater than 2) is determined by the comparator 101. Further, in the second determination section 112, whether the in-cylinder oxygen excess ratio difference between the in-cylinder oxygen excess ratio and the optimum value thereof is less than the second threshold is determined. Then, the determination results by the respective determination sections are input into an OR circuit 126, whereby the switching control is canceled if either of the determination sections determines the engine 1 not to be in the transient state. It is thereby possible to rapidly cancel the switching control when the normal state comes back from the transient state.

The first determination section 110 and the second determination section 112 are examples of the "fourth determination part" and the "fifth determination part" according to the present invention, respectively. Particularly in this embodiment, the "fourth threshold value" and the "fifth threshold value" according to the present invention are set to be equal to the "first threshold value" and the "second threshold value" according to the present invention, respectively; however, they may be different from each other, respectively.

As described above, according to the control unit 57 in the first embodiment, the temporary increase in the supply air oxygen concentration and decrease in the in-cylinder oxygen excess ratio in the transient state can be suppressed, whereby it is possible to perform a coordinate control which enables reduction of the emission amounts of NOx and PM.

Second Embodiment

Figure 6:
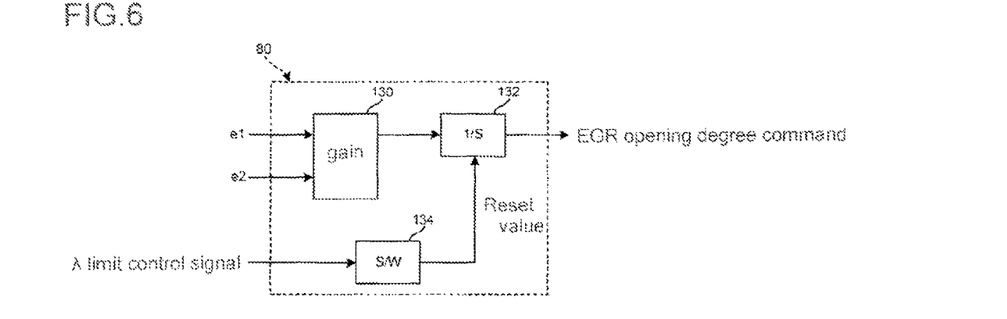
FIG. 6 is a block diagram illustrating an internal constitution of a PID control part 80 of a control unit of an internal combustion engine according to a second embodiment of the present invention.

With reference to FIG. 6, a control unit of an internal combustion engine according to a second embodiment will be described. In the description of the second embodiment, the same elements as those of the first embodiment are assigned with the same reference numerals as those of the first embodiment, and the same description thereof will be omitted.

FIG. 6 is a block diagram illustrating an internal constitution of a PID control part 80 of a control unit of an internal combustion engine according to a second embodiment of the present invention. As described in above First Embodiment, the difference e1 between the actual supercharging pressure y1 and the target supercharging pressure r1 set by the target supercharging pressure setting part 65, and the difference e2 between the supply air oxygen concentration y2 estimated by the state quantity estimation section 77 and the target supply air oxygen concentration r2 set by the target supply air oxygen concentration setting part 73 are input into the PID control section 80. The PID control section 80 outputs a VFT opening degree command based on the input difference e1 as well as an EGR opening degree command based on the difference e2. Particularly, FIG. 6 illustrate a case where after a prescribed gain 130 is applied based on the difference e2, the EGR opening degree command is output via an integrator 132.

On the other hand, a λ limit control signal which indicates whether the above switching control is being performed or not is input into the PID control section 80 from the λ limit control section 81. A S/W 134 is a switching part which outputs a reset signal when the λ limit control signal is in the ON-state (i.e. when the switching control is performed). When the reset signal is input into the integrator 132, the integrator 132 resets an integrated value of the gain 130 and outputs an EGR control valve command so as to bring the EGR control valve 41 to the prescribed opening degree.

With a conventional art, when the transient state ends and the normal operating state comes back, a delay may be caused until the opening degree of the EGR control valve 41 which has been closed by switching during the transient state is increased, and the supply air oxygen concentration and therefore NOx may be increased. In the above embodiment, when the transient state ends, a control is performed to bring the opening degree of the EGR control valve 41 to the prescribed opening degree, whereby it is possible to rapidly increase the opening degree of the EGR control valve 41 to prevent the increase in NOx.

Third Embodiment

Figure 7:
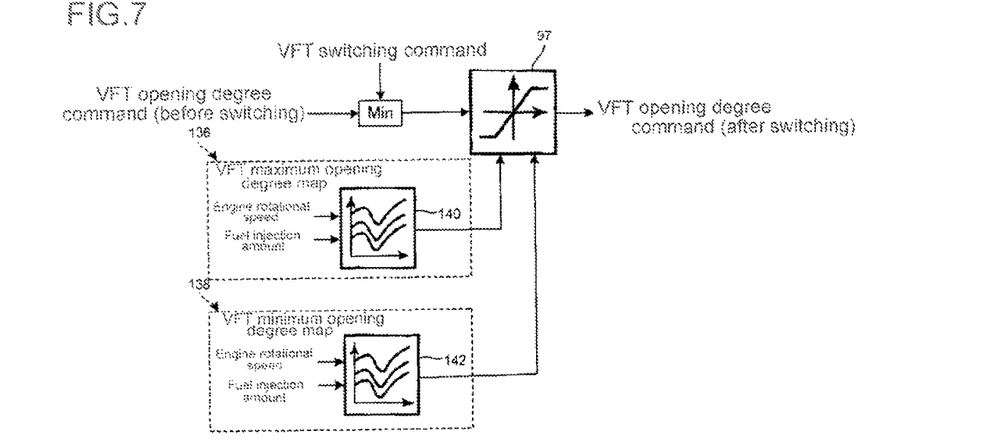
FIG. 7 is a block diagram illustrating a constitution around a VFT command value limiter of a control unit of an internal combustion engine according to a third embodiment of the present invention.

With reference to FIG. 7, a control unit of an internal combustion engine according to a third embodiment will be described. In the description of the third embodiment, the same elements as those of the first or second embodiment are assigned with the same reference numerals as those of the first or second embodiment, and the same description thereof will be omitted.

FIG. 7 is a block diagram illustrating a constitution around a VFT command value limiter 97 of a control unit of an internal combustion engine according to a third embodiment of the present invention. The VFT command value limiter 97 is an example of the "supercharging command signal limiting part" according to the present invention and is for limiting the VFT opening degree command to a range defined by an upper limit set by an upper limit setting part 136 and a lower limit set by a lower limit setting part 138. The range set by the upper limit setting part 136 and the lower limit setting part 138 is the range of the opening degree of the VFT valve 23 which is allowed in the normal state of the engine 1, and the upper limit and the lower limit are defined depending upon the operating status of the engine 1 by a VFT maximum opening degree map 140 and a VFT minimum opening degree map 142, respectively.

In general, in a case where the opening degree of the VFT control valve 23 is under a feedback control, when the actual supercharging pressure is larger than the target supercharging pressure, a VFT opening degree command to decrease the supercharging pressure is generated. When the VFT opening degree signal is a decreasing command as above, if the transient state (e.g. sudden acceleration of a vehicle) occurs in which the load of the engine 1 is increased, the time lag until the supercharging pressure is turned upward will be increased. Then, the in-cylinder oxygen excess ratio will be decreased in the transient state, and the PM in the exhaust gas will be increased, which may lead to a problem. According to this embodiment, by limitation by the VFT command value limiter 97, the opening degree of the VFT control valve 23 is brought to the opening degree in the steady state of the engine 1 to cause the supercharging pressure not to be excessively decreased, whereby it is possible to suppress the time lag at the time of occurrence of the transient state, thereby to suppress the increase of PM.

INDUSTRIAL APPLICABILITY

The present invention relates to a control unit of an internal combustion engine and is applicable particularly to a coordinate control of an exhaust gas recirculation (hereinafter abbreviated as "EGR") control by an EGR apparatus of an internal combustion engine and a supercharger control by a supercharger provided with a variable flow mechanism.

The invention claimed is:

1. A control unit of an internal combustion engine comprising:
   one or more processing devices receiving instructions to perform:
   an exhaust gas recirculation (EGR) control step sending an EGR command signal so as to bring an EGR gas supply amount by an EGR apparatus to a target EGR gas supply amount to control an opening degree of an EGR valve;
   a supercharger control step sending a supercharging command signal so as to bring a supercharging amount of a supercharger provided with a variable flow mechanism to a target supercharging amount to control an opening degree of the variable flow mechanism;
   an in-cylinder oxygen excess ratio calculation step calculating an in-cylinder oxygen excess ratio based on an operating state of the internal combustion engine;
   a transient state determination step determining whether the internal combustion engine is in a transient state based on the in-cylinder oxygen excess ratio in the cylinder calculated by the in-cylinder oxygen excess ratio calculation step; and
   a switching step switching the EGR command signal and the supercharging command signal so that the opening degree of the EGR valve and the opening degree of the variable flow mechanism become smaller than in a normal state when the internal combustion engine is determined to be in the transient state by the transient state determination step;
   wherein the transient state determination step comprises:
   a first determination step determining whether the in-cylinder oxygen excess ratio calculated by the in-cylinder oxygen excess ratio calculation step is not greater than a first threshold value; and
   a second determination step determining whether an in-cylinder oxygen excess ratio difference between the in-cylinder oxygen excess ratio calculated by the in-cylinder oxygen excess ratio calculation step and an optimum value of the in-cylinder oxygen excess ratio which is preliminarily set on the basis of the operating state of the internal combustion engine is not less than a second threshold value, and;

wherein the transient state determining step determines the internal combustion engine to be in the transient state when the first determination step determines that the in-cylinder oxygen excess ratio is not greater than the first threshold value and the second determination step determines that the in-cylinder oxygen excess ratio difference is not less than the second threshold value, such that the switching step switches the EGR command signal and the supercharging command signal to reduce the opening degree of the EGR valve and the opening degree of the variable flow mechanism than in the normal state to reduce emission amount of nitrogen oxides (NOx) and smoke (PM).

2. The control unit of an internal combustion engine according to claim 1, wherein the switching step is configured to switch the EGR command signal and the supercharging command signal so as to bring the opening degree of the EGR valve to a lower limit which is preliminarily set and the opening degree of the variable flow mechanism to a lower limit which is preliminarily set.

3. The control unit of an internal combustion engine according to claim 2, wherein the lower limit of the opening degree of the EGR valve is preliminarily set depending upon the operating state of the internal combustion engine.

4. The control unit of an internal combustion engine according to claim 1, wherein the transient state determination step comprises a third determination step determining whether a supercharging pressure difference between a supercharging pressure of the supercharger and an optimum value of the supercharging pressure which is preliminarily set on the basis of the operating state of the internal combustion engine is not less than a third threshold value, and determining the internal combustion engine to be in the transient state when the third determination step further determines that the supercharging pressure difference is not less than the third threshold value.

5. The control unit of an internal combustion engine according to claim 1, wherein the switching step cancels a switching control of the EGR command signal and the supercharging command signal when the internal combustion engine is determined not to be in the transient state by the transient state determination step.

6. The control unit of an internal combustion engine according to claim 5, wherein the transient state determination step comprises:
a fourth determination step determining whether the in-cylinder oxygen excess ratio calculated by the in-cylinder oxygen excess ratio calculation step is greater than a fourth threshold value; and
a fifth determination step determining whether an in-cylinder oxygen excess ratio difference between the in-cylinder oxygen excess ratio calculated by the in-cylinder oxygen excess ratio calculation step and an optimum value of the in-cylinder oxygen excess ratio which is preliminarily set on the basis of the operating state of the internal combustion engine is less than a fifth threshold value, and
the transient state determination step determines the internal combustion engine not to be in the transient state when the fourth determination step determines that the in-cylinder oxygen excess ratio is greater than the fourth threshold value or the fifth determination step determines that the in-cylinder oxygen excess ratio difference is less than the fifth threshold value.

7. The control unit of an internal combustion engine according to claim 5, wherein upon canceling the switching control, the switching step resets the EGR command signal so as to bring the opening degree of the EGR valve to a prescribed opening degree which is larger than the opening degree at the time of the switching control.

8. The control unit of an internal combustion engine according to claim 1, wherein the one or more processors further executes:
a supercharging command signal limiting step limiting the supercharging command signal so as to bring the opening degree of the variable flow mechanism to an opening degree in a steady state of the internal combustion engine.

* * * * *